No. 644,587. Patented Mar. 6, 1900.
A. T. FISCHER & E. C. LEWIS.
COMBINED GANG CULTIVATOR, HARROW, AND HILLER.
(Application filed July 6, 1899.)

(No Model.)

Witnesses
H. L. Ames,
Rexford M. Smith.

Inventors
A. T. Fischer and
E. C. Lewis.
By V. D. Stockbridge,
Attorney

THE NORRIS PETERS CO., PHOTO-LITHO., WASHINGTON, D. C.

UNITED STATES PATENT OFFICE.

ALEXANDER THEODORE FISCHER AND EDWIN CHARLES LEWIS, OF DETROIT, MICHIGAN.

COMBINED GANG CULTIVATOR, HARROW, AND HILLER.

SPECIFICATION forming part of Letters Patent No. 644,587, dated March 6, 1900.

Application filed July 6, 1899. Serial No. 722,971. (No model.)

*To all whom it may concern:*

Be it known that we, ALEXANDER THEODORE FISCHER and EDWIN CHARLES LEWIS, citizens of the United States, residing at Detroit, in the county of Wayne and State of Michigan, have invented a certain new and useful Combined Gang Cultivator, Harrow, and Hiller, of which the following is a specification, reference being had therein to the accompanying drawings.

This invention relates to combined gang cultivators, harrows, and hillers for working all kinds of growing crops in rows or drills, and is especially adapted for cultivating root-crops, as beets and other garden truck.

One object of the invention is to provide a device or apparatus which may be used for cutting or severing weeds and pulverizing the earth between rows or drills of growing vegetation or for cutting or severing weeds and raking and loosening the same or for use as a hiller to throw earth up and around the roots of growing plants.

Another object is to improve the operation of cultivating implements generally by applying the draft to about the middle of the frame instead of at the front end.

A further object is to regulate and gage the depth of the work or cut of the cutters or plows, both in front and rear, so that whatever weight or pressure is given to the frame the depth of the work will be constant.

The invention consists in certain combinations hereinafter described, and pointed out in the claims.

Figure 1:
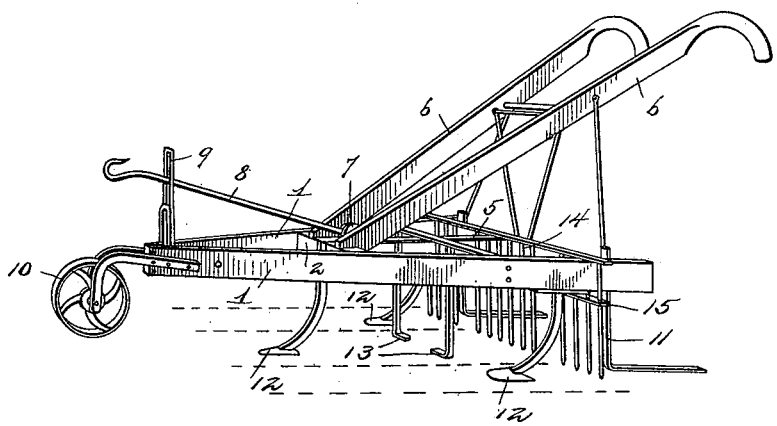
Figure 3:
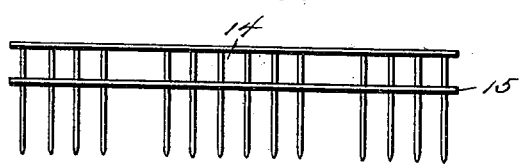
Figure 2:
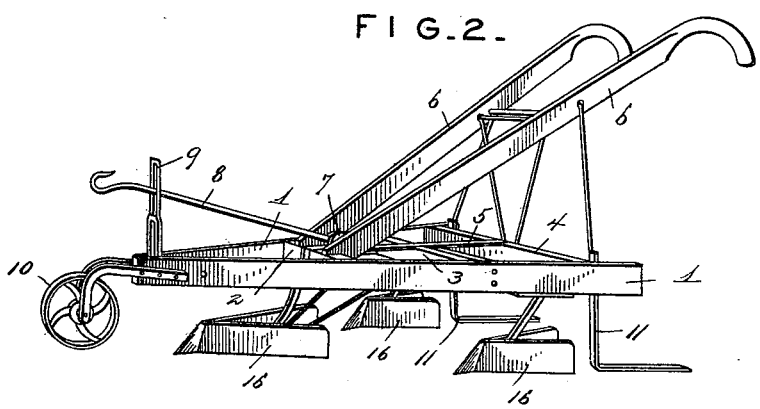

In the drawings forming a part of this specification, Figure 1 is a perspective of our improved cultivator as applied to working rows of growing plants as a cutting and raking device. Fig. 2 is a perspective of the same, showing the device provided with plows for the purpose of throwing earth against or toward the roots of the plants as a hiller. Fig. 3 is a front elevation of the detachable rake.

The frame of our improved cultivator consists of side pieces 1 1, secured together at an angle with each other, the apex being bolted and the diverging sides being supported by thwarts or cross bars or beams 2 3 4, the cross-pieces being strengthened and tied together by means of an iron plate or strap 5. Suitably connected with the forward cross-bar 2 are handles 6 6, through which the operator may control the device. The handles are held and supported in rigid relation with the frame by means of suitable braces, as shown. There is also connected with the forward cross-bar 2 a bifurcated riser or bracket 7, to which is pivotally connected a draft bar or link 8, having a suitable hook at its forward extremity. The draft-iron is held in alinement with the frame through the medium of a slotted post 9, firmly secured at or near the apex or forward angle of the frame. Connected with the forward end of the frame is a roller-gage 10. This roller is adjustable in connection with the frame up and down, so as to afford a greater or less depth of cut of either the cutters or the hiller. At the rear end of the frame, behind the outside cutters, we arrange adjustable gages 11 11. These gages may be rollers or runners; but we prefer to make them in the form of a shoe or slide, as shown in the drawings. By reason of the forward gage 10 and the rear gages 11 11 we are enabled to regulate with great accuracy the depth to which the plows or cutters will work, so as to make the same uniform or substantially uniform in either hard or soft ground and without reference to the weight or excessive pressure upon the frame. By reason of connecting the draft bar or link at about the middle of the frame the cultivator will operate with greater uniformity and satisfaction than is the case when the draft is applied directly to the front end of the frame, because there is no tendency to lift the cutters out or to force them into the earth whatever the height of the horse, as the draw-bar 8 is free to rise and fall in the slotted part 9.

Connected with the frame, as shown in Fig. 1, are cutters 12 12, arranged in planes, so that they will pass between or in the spaces between four rows of growing plants. The cutters 12 12 are preferably made in substantially the form shown in the drawings, so as to be in nearly a horizontal plane and operate as cutters for severing weeds and grasses in their path, at the same time lightening up and pulverizing the earth. In cultivating roots like beets we also provide cutting-blades of the form shown at 13 13 to pass along between the central rows, which for beets should be twenty inches or more apart, while the side rows may be from twelve to sixteen inches apart. In this way about one-third more rows may be planted in a given space or area. These cutters are arranged with their toes projecting toward each other, as clearly shown in Fig. 1. As shown in this figure, there are five cutters, three of the form 12 and two of the form 13, arranged to pass along the middle row of plants. For cultivating garden truck or other plants we provide a gang-rake 14, which is readily arranged across the rear end of the frame in front of the rear bar 4, the teeth of the rake passing through the perforated thwart or cross plate 15, arranged just in front of and below the cross-bar 4. By the use of this rake in connection with the cutters weeds are severed and shaken up, so that no earth is left on them and so they will be dried in the sun and will not again take root. The rake also serves to finely pulverize the earth between the plants and can be adjusted so as to work closer to the roots of the plants than would be safe for the cutters.

When the device is to be used as a hiller, plows 16 16 or their equivalents are to be used.

It will be noted that according to our construction we have provided a one-horse gang cultivator, harrow, and hiller simple in construction and efficient in operation. It should also be noted that the rear gages or slides 11 11 not only serve as a limit to the depth of the rake, but they operate as rudders or means through which the cultivator may be conveniently guided and prevented from moving or being thrown laterally to injure the plants being worked.

Having thus described our invention, what we claim as new, and desire to secure by Letters Patent, is—

1. In gang-cultivators for simultaneously working three or more rows of garden truck, the combination of a frame and three or more rows of cutters or hillers interchangeably connected with the frame, the middle row of cutters being wider or covering more space than the side rows, substantially as described.

2. In gang-cultivators for simultaneously working three or more rows of garden truck, the combination of a frame, three or more rows of cutters or hillers interchangeably connected with the frame, the middle row of cutters being wider than the side rows, and gages in front and rear for regulating the depth of the work.

3. In gang-cultivators for simultaneously working three or more rows of garden truck, the combination of a frame, three or more rows of cutters or hillers interchangeably connected with the frame, the middle row of cutters being wider than the side rows, and an adjustable or removable rake arranged athwart the rear end of the frame, substantially as described.

4. In straddle-row cultivators, the combination of a frame, three or more rows of cutters or hillers interchangeably connected with the frame, the middle row being wider than the side rows, an adjustable or removable rake arranged athwart the rear end of the frame, and a draft appliance attached to the middle of the frame, substantially as described.

In testimony whereof we affix our signatures in presence of two witnesses.

ALEXANDER THEODORE FISCHER.
EDWIN CHARLES LEWIS.

Witnesses:
HERMAN A. MILLER,
JOSEPH F. KAUFMANN.